United States Patent [19]

Cuisia

[11] Patent Number: 5,200,105

[45] Date of Patent: Apr. 6, 1993

[54] SCALE CONTROL IN AQUEOUS SYSTEMS

[75] Inventor: Dionisio G. Cuisia, Buffalo Grove, Ill.

[73] Assignee: W. R. Grace & Co.-Conn., New York, N.Y.

[21] Appl. No.: 790,105

[22] Filed: Nov. 7, 1991

Related U.S. Application Data

[63] Continuation of Ser. No. 512,282, Apr. 20, 1990, abandoned.

[51] Int. Cl.$^5$ .............................................. C02F 5/14
[52] U.S. Cl. ..................................... 252/180; 210/699; 210/700; 210/701; 252/82
[58] Field of Search ............................... 210/698–701; 252/82, 180

[56] References Cited

U.S. PATENT DOCUMENTS

| | | | |
|---|---|---|---|
| 3,085,916 | 4/1963 | Zimmie et al. | 137/22 |
| 3,463,730 | 8/1969 | Booth | 210/701 |
| 3,663,448 | 5/1972 | Ralston | 252/180 |
| 4,076,501 | 2/1978 | Harris et al. | 106/14 |
| 4,088,678 | 5/1978 | Matt et al. | 252/180 |
| 4,105,581 | 8/1978 | Sexsmith | 252/181 |
| 4,159,946 | 7/1979 | Smith et al. | 210/699 |
| 4,231,894 | 11/1980 | Lavin et al. | 210/700 |
| 4,255,259 | 3/1981 | Hwa et al. | 210/699 |
| 4,339,371 | 7/1982 | Robinson et al. | 524/310 |
| 4,446,045 | 5/1984 | Snyder et al. | 210/701 |
| 4,460,627 | 7/1984 | Weaver et al. | 166/275 |
| 4,532,052 | 7/1985 | Weaver et al. | 166/275 |
| 4,545,920 | 10/1985 | Lorenc et al. | 210/701 |
| 4,557,896 | 12/1985 | Brocklebank et al. | 422/14 |
| 4,560,481 | 12/1985 | Hollander | 210/697 |
| 4,576,722 | 3/1986 | Gaylor et al. | 252/180 |
| 4,617,230 | 11/1986 | Shah et al. | 428/288 |
| 4,631,131 | 12/1986 | Cuisia et al. | 210/698 |
| 4,640,793 | 2/1987 | Persinski et al. | 210/699 |
| 4,663,053 | 5/1987 | Geiger | 210/699 |
| 4,711,726 | 12/1987 | Pierce et al. | 210/701 |
| 4,744,949 | 5/1988 | Hoots et al. | 422/15 |
| 4,801,387 | 1/1989 | Chen | 210/699 |
| 4,828,795 | 5/1989 | Cook et al. | 422/15 |
| 4,847,017 | 7/1989 | Clubley et al. | 562/24 |
| 4,867,945 | 9/1989 | Sherwood et al. | 210/701 |
| 4,978,456 | 12/1990 | Sprague | 210/701 |

*Primary Examiner*—Peter Hruskoci
*Attorney, Agent, or Firm*—James P. Barr

[57] ABSTRACT

A composition and process for preventing the deposition of scale and sludge in aqueous systems comprising adding to the system the combination of three or more additives selected from the group consisting of a) polyacrylic acid, copolymer of allylsulfonate and maleic anhydride and mixtures thereof, b) hydroxyethylidene diphosphonic acid, amino (trimethyl phosphonic acid), diethylenetriamine pentaacetic acid, and mixtures thereof, and c) copolymer of styrene sulfonate and maleic anhydride, copolymer of acrylic acid and acrylamide, poly(acrylic acid-co-hypophosphite) and mixtures thereof, and wherein the combination contains at least one additive selected from each of a), b) and c).

6 Claims, No Drawings

SCALE CONTROL IN AQUEOUS SYSTEMS

This is a continuation of application Ser. No. 512,282, filed Apr. 20, 1990 now abandoned.

BACKGROUND OF THE INVENTION

1. Field of the Invention

This invention relates to compositions useful for inhibiting the deposition of scale and sludge deposits in aqueous systems particularly in steam generating boilers, and more specifically this invention relates to improved compositions comprising three or more additives selected from the group consisting of a) polyacrylic acid, copolymer of alkyl sulfonate and maleic anhydride, and mixtures thereof, b) amino (trimethylene phosphonic acid), hydroxyethylidene diphosphonic acid, diethylenetriamine pentaacetic acid, and mixtures thereof, and c) copolymer of styrene sulfonate and maleic anhydride, copolymer of acrylic acid and acrylamide, poly(acrylic acid- co- hyphosphite) and mixtures thereof, wherein at least one additive is selected from each of a), b) and c) supra.

2. Description of Prior Art

The formation of scale and sludge deposits on heating surfaces is the most serious problem encountered in boiler operations. External water softening only partially removes from the boiler feedwater those scale-forming substances. In most industrial boilers, internal chemical treatment is applied to the boiler water to combat the scale-forming tendency of entrained impurities, such as calcium, magnesium salts, iron and silica. The internal chemical treatment of boiler water can be accomplished by either non-precipitation or precipitation treatment programs. Under the non-precipitation treatment program, chelants such as NTA (nitrilotriacetic acid) and EDTA (ethylenediamine tetraacetic acid) are used. EDTA is capable of preventing calcium and magnesium deposits by solubilizing and moving these scale-forming substances through the boiler system until they are removed by blowdown. However, EDTA is known to be corrosive under certain conditions for example when there is excessive residual in the boiler.

Under the precipitation treatment program, commonly used precipitating chemicals include soda ash and sodium phosphates, e.g. disodium phosphate, trisodium phosphate and sodium metaphosphate. Thus, magnesium is precipitated as magnesium hydroxide by increasing the alkalinity of the boiler water. The precipitate or sludge, which can be made non-sticky and easily manageable by the addition of a dispersant or sometimes called sludge conditioner, is periodically or continuously removed from the boiler through blowdown. A wide variety of materials have been used as boiler dispersants such as sodium polyacrylates, sodium polymethacrylates, sodium carboxymethylcellulose, styrene-maleic anhydride copolymers, etc. However, the results of their dispersants have not been completely satisfactory.

SUMMARY OF THE INVENTION

It is an object of this invention to provide improved compositions for inhibiting the deposition of scale and sludge in aqueous systems.

In accordance with this invention, there have been provided certain novel compositions which are comprised of a mixture of at least three additives selected from the group consisting of;

a) polyacrylic acid (PAA), copolymer of allyl sulfonate and maleic anhydride (ASMA) and mixtures thereof, b) amino(trimethylene phosphonic acid) (AMP), hydroxyethylidene diphosphonic acid (HEDPA), diethylenetriamine pentaacetic acid (DTPA) and mixtures thereof, and c) copolymer of styrene sulfonate and maleic anhydride (SMA), copolymer of acrylic acid and acrylamide (AAA), poly(acrylic acid-co-hypophosphite) (PAAHP) and mixtures thereof, wherein at least one additive is selected from each of a), b) and c) supra. The novel compositions of this invention exhibit surprising and unexpected activity in preventing and controlling scale and sludge deposits in aqueous systems under both precipitation and non-precipitation treatment programs.

DETAILED DESCRIPTION

The present invention is directed to compositions with improved effectiveness for inhibiting the deposition of scale and sludge in aqueous systems. The compositions of this invention comprise a combination of three or more additives selected from the group consisting of;

a) polyacrylic acid (PAA), copolymer of allyl sulfonate and maleic anhydride. (ASMA) and mixtures thereof, b) hydroxyethylidene diphosphonic acid (HEDPA), amino(trimethylene phosphonic acid) (AMP) and diethylenetriamine pentaacetic acid (DTPA) and mixtures thereof, and c) copolymer of styrene sulfonate and maleic anhydride (SMA), copolymer of acrylic acid and acrylamide (AAA), poly(acrylic acid-co-hyphophosphite) (PAAHP) and mixtures thereof, wherein at least one additive is selected from each of a), b) and c) supra.

The ratio of additives a:b:c is typically in the range (9-1):(9-1):5–0.5, preferably (6-2):(6-2):(3:1) respectively on an active basis. Mixtures within a group, for example in group a) polyacrylic acid together with copolymer of allyl sulfonate and maleic anhydride, are typically in the range (10-1):(1-10) and are preferably 1:1 on an active basis.

The polyacrylic acid preferably has a low molecular weight in the range of 800 to 90,000, most preferably 1000 to 5000 on a weight average basis. The copolymer of allyl sulfonate and maleic anhydride typically has a weight ratio of 10:1 to 1:10 respectively, preferably 1:1 and has a molecular weight in the 800 to 90,000 preferably 1000 to 10,000 on a weight average basis. The hydroxyethylidene diphosphonic acid and the amino(trimethylene phosphonic acid) are commercially available and conventional procedures for preparation of these are described, for example, in U.S. Pat. No. 3,214,454 and U.S. Pat. No. 3,234,124 respectively. These phosphonates can be in potassium, sodium or ammonium salts. The diethylenetriamine pentaacetic acid can be "as is" in acid form or in water soluble salts such as sodium, potassium and ammonium, most preferably the sodium salts. The DTPA is commercially available under the trademark of Hamp-EX Acid or Hamp-Ex 80 in sodium salts, of W. R. Grace & Co.-Conn. The poly(acrylic acid-co-hypophosphite) can be in a weight ratio of 20:1 to 1:20 respectively, preferably 4:1 to 16:1 having a molecular weight in the range of 1000 to 20,000, preferably 1,000 to 5,000 on a weight average basis. The copolymer of styrene sulfonate and maleic anhydride can be in a weight ratio of 10:1 to 1:10 respectively, preferably 1:1 having a molecular weight in the range 800 to 20,000, preferably 1000 to 5000 on a weight average basis. The copolymer of acrylic acid and acrylamide typically has a weight ratio of 1:10 to 10:1 and a molecular weight in the range 800 to 90,000 preferably 1000 to 10,000 on a weight average basis.

The combination of additives in accordance with this invention are capable of preventing and controlling scale in aqueous systems, such as steam generating boilers, under both the precipitation and non-precipitation treatment programs.

The total amounts of each additive can vary widely, provided it is in an amount effective to control the deposition of scale and sludge and in general, each additive is present in the range 0.1 ppm to 500 ppm, preferably 0.5 to 10 ppm and most preferably between 1 to 5 ppm.

The additives may be added to the aqueous system individually or they may be blended into uniform, homogeneous mixture, and optionally diluted with a suitable water-miscible diluents. In such mixtures, additives, (a) will normally be present in an amount from 15 to 90%, preferably 40 to 70%, and most preferably 45 to 55% by weight. The amount of the second additive, (b), will generally be in the range 5 to 45%, preferably 10 to 35 and most preferably 20 to 30% by weight. Thus, the amount of the third component is generally between 5 to 40%, preferably 10 to 25 and most preferably 15 to 20% by weight.

In addition to the instant composition, it is possible to incorporate into the composition or add to the aqueous system other materials used in the treatment of aqueous systems. Such materials include, but are not limited to corrosion inhibitors.

The following examples are provided to illustrate the invention, but are not to be construed as limiting the invention in any way except as indicated on the appended claims. The examples provided herein include various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention.

The evaluation of the effectiveness of the additives under the non-precipitation and precipitation treatment programs was carried out in a small laboratory boiler. This boiler has been described previously in the proceedings of the Fifteenth Annual Water Conference, Engineers Society of Western Pennsylvania, pages 87–102.

EXAMPLE 1

Using the laboratory boiler, the efficiency of the blended additives to transport calcium, magnesium and iron through the boiler system was tested at 200 psig for four days. The feedwater contained about 2 ppm as $CaCO_3$ of total hardness having a 2:1 (as $CaCO_3$) of calcium to magnesium ratio, 0.5 ppm as Fe of iron, 20 ppm as Cl of chloride, 35 ppm as $SO_4$ of sulfate and less than 1 ppm as $SiO_2$ of silica. The boiler water concentration was about ten times. Sodium hydroxide and sodium sulfite were used to maintain a hydroxide alkalinity of 300–350 ppm as $CaCO_3$ and a residual sulfite of at least 20 ppm as $SO_3$. The feedwater and boiler water samples were analyzed for calcium, magnesium and iron by atomic absorption.

Various blended additives were tested using a dosage of 5:1 active additive per total hardness plus iron. The compositions tested have shown excellent total hardness recovery in the boiler.

| | | |
|---|---|---|
| 1. Composition I | PAA + AMP + SMA | (6:3:2 active) |
| 2. Composition II | PAA + DTPA + AAA | (6:3:2 active) |
| 3. Composition III | AAA + AMP + ASMA | (6:6:2 active) |
| 4. Composition IV | ASMA + AMP + AAA | (6:3:2 active) |
| 5. Composition V | ASMA + HEDPA + SMA | (6:3:2 active) |
| 6. Composition VI | PAA + AMP + SMA | (6:6:2 active) |
| 7. Composition VII | ASMA + HEDPA + SMA | (6:3:4 active) |
| 8. Composition VIII | PAA + AMP + AAA + PAAHP | (6:3:2:2 active) |
| 9. Composition IX | PAA + AMP + SMA + ASMA | (6:3:2:2 active) |
| 10. Composition X | PAA + HEDPA + AAA + PAAHP | (6:3:2:2 active) |

The excellent total hardness transport performance of the 10 products is illustrated in the following table.

TABLE 1

| | Performance in % Transport | | |
|---|---|---|---|
| Run No. | Additive | Total Hardness | Iron |
| R-20 | None (Blank) | 15.3 | 0.8 |
| C-1429 | Composition I | 161.7 | 41.6 |
| C-1430 | Composition II | 127.4 | 66.2 |
| R-43 | Composition III | 111.0 | 81.5 |
| C-1435 | Composition IV | 115.0 | 11.5 |
| R-23 | Composition V | 110.0 | 82.1 |
| R-42 | Composition VI | 89.0 | 86.4 |
| R-30 | Composition VII | 87.5 | 91.2 |
| R-32 | Composition VIII | 90.4 | 68.8 |
| R-33 | Composition IX | 84.2 | 72.5 |
| R-38 | Composition X | 94.8 | 90.4 |

When the individual additives were evaluated for material transports at 200 psig, the following data were obtained.

TABLE 2

| Run Nos. | Additive | % Total Hardness Transport | % Iron Transport |
|---|---|---|---|
| M-1911/R-11 | None (Blank) | 17.0 | 0.7 |
| C-1416/R-12 | PAA | 77.9 | 3.4 |
| C-1417/C-1422 | SMA | 35.9 | 30.4 |
| M-1906/M-1913 | AAA | 71.8 | 23.5 |
| C-1415/R-12 | ASMA | 56.0 | 22.4 |
| R-48/R-49 | PAAHP | 74.4 | 14.9 |
| M-1909/M-1914 | HEDPA | 24.7 | 22.0 |
| R-8/M-1916 | AMP | 39.2 | 17.5 |
| C-1418/R-21 | DTPA | 51.8 | 32.2 |
| R-7/R-10 | EDTA | 68.8 | 12.1 |

EXAMPLE 2

Using the same procedure as in Example 1, except the boiler pressure was 600 psig, the excellent total hardness transport performance of three products tested is shown as follows:

TABLE 3

| Run No. | Additive | % Total Hardness Transport |
|---|---|---|
| R-50 | None (Blank) | 20.2 |
| R-52 | Composition VII | 115.9 |
| R-51 | Composition X | 98.1 |
| R-81 | Composition VIII | 95.9 |

EXAMPLE 3

The scale preventing property of the blended additives on a precipitation boiler water treatment program was determined using the same small laboratory boiler. The boiler has three removable tubes. After the completion of a test, the boiler tubes were removed from the boiler. The scale or deposit formed on the six inches of the central length of each tube was removed by scraping, collected in a tared vial and weighed. The scale scraped on the tubes on a blank test (no additive) and on a test with the additive being tested is compared.

The feedwater for the evaluation of additives was prepared by diluting Lake Zurich, Ill. tap water with distilled water to 40 ppm total hardness as $CaCO_3$, followed by adjustment to a 6 to 1 elemental calcium to magnesium ratio using calcium chloride and/or magnesium chloride. The feedwater was fed to the boiler together with chemical treatment solutions (containing sodium sulfate, sodium sulfite, sodium hydroxide, sodium chloride, disodium phosphate and the additives for scale prevention) in a ratio of three volumes of feedwater to one volume of chemical treatment solution, giving a feedwater total hardness of 30 ppm as $CaCO_3$. In the case of a blank test, no additive was added. All scaling tests, whether boiler water additive was present or absent (blank), were carried out in fixed manner as described as follows: Boiler blowdown was adjusted to 10% of the boiler feedwater, giving approximately 10 concentrations of the boiler water salines. Using the feedwater described previously in this paragraph, the composition of the chemical treatment solution was adjusted to give a boiler (after the 10 concentrations) of the following composition.

TABLE 4

| | |
|---|---|
| Sodium hydroxide as NaOH | 258 ppm |
| Sodium carbonate as $Na_2CO_3$ | 120 ppm |
| Sodium chloride as NaCl | 681 ppm |
| Sodium sulfite as $Na_2SO_3$ | 30-50 ppm |
| Sodium sulfate as $Na_2SO_4$ | 819 ppm |
| Silica as $SiO_2$ | less than 1 ppm |
| Iron as Fe | less than 1 ppm |
| Phosphate as $PO_4$ | 20-40 ppm |

All scaling tests were run for 47 hours each at a boiler pressure of 400 psig.

The effective scale inhibiting properties of the blended additive products are illustrated in the following table.

TABLE 5

| Run No. | Additives | Active Dosage in the Feed, ppm | Scaling Rate, sq/ft$^2$/hr | Scale Reduction, % |
|---|---|---|---|---|
| M-1947 | None (Blank) | — | 0.220 | — |
| M-1443 | PAA | 1 | 0.046 | 79.1 |
| M-1703 | SMA | 1 | 0.010 | 95.4 |
| M-1716 | AAA | 1 | 0.061 | 72.3 |
| C-113S | ASMA | 1 | 0.006 | 97.3 |
| C-1506 | PAAHP | 1 | 0.099 | 58.2 |
| M-398 | UEDPA | 1 | 0.145 | 34.1 |
| M-372 | AMP | 1 | 0.074 | 66.4 |
| C-1439 | Composition I | 1 | 0.000 | 100.0 |
| M-1934 | Composition V | 1 | 0.002 | 99.1 |
| M-1936 | Composition VII | 1 | 0.004 | 98.2 |
| M-1939 | Composition X | 1 | 0.009 | 95.9 |
| C-1441 | Composition I | 0.5 | 0.015 | 93.8 |
| M-1935 | Composition V | 0.5 | 0.128 | 39.4 |
| M-1938 | Composition VII | 0.5 | 0.042 | 80.1 |
| M-1940 | Composition X | 0.5 | 0.069 | 68.6 |
| M-1950 | Composition VI | 0.5 | 0.019 | 90.9 |
| M-1946 | Composition III | 0.5 | 0.065 | 70.4 |

I claim:

1. A composition for inhibiting the deposition of scale and sludge in aqueous systems comprising the combination of three or more additives selected from the group consisting of
   (a) polyacrylic acid (PAA) having a molecular weight of from 1000 to 90,000, copolymer of allyl sulfonate and maleic anhydride (ASMA) having a molecular weight of from 1,000 to 10,000 and a weight ratio of 1:1, and mixtures thereof,
   (b) hydroxyethylidene diphosphonic acid (HEDPA), amino (trimethylene)phosphonic acid (AMP), diethylenetriamine pentaacetic acid (DTPA) and mixtures thereof, and
   (c) copolymer of acrylic acid and acrylamide (AAA) having a molecular weight of from 1000 to 10,000 and a weight ratio of 1:10 to 10:1, and wherein the combination contains at least one additive selected from each of (a), (b), and (c) supra in a ratio of a:b:c of (6-2):(6-2):(3-1) respectively on an active basis.

2. A composition according to claim 1 wherein the ratio of additives a:b:c is from about 6:3:2 respectively.

3. A composition according to claim 1 wherein (a) is polyacrylic acid, (b) is diethylenetriamine pentaacetic acid and (c) is copolymer of acrylic acid and acrylamide.

4. A composition according to claim 1 wherein (a) is copolymer of allyl sulfonate and maleic anhydride, (b) is amino(trimethylene phosphonic acid) and (c) is copolymer of acrylic acid and acrylamide.

5. A composition according to claim 1 wherein (a) is polyacrylic acid, (b) is amino(trimethylene phosphonic acid), and (c) is a mixture of copolymer of acrylic acid and acrylamide, and poly(acrylic acid-co-hypophosphite).

6. A composition according to claim 1 wherein (a) is polyacrylic acid, (b) is hydroxyethylidene diphosphonic acid, and (c) is a mixture of copolymer of acrylic acid and acrylamide and poly(acrylic acid-co-hypophosphite).

* * * * *